United States Patent
Wang (10) Patent No.: US 7,581,891 B2
(45) Date of Patent: Sep. 1, 2009

(54) LASER ADJUSTMENT IN INTEGRATED OPTOELECTRONIC MODULES/FIBER OPTIC CABLES

(75) Inventor: Xiaozhong Wang, Sunnyvale, CA (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 11/836,519

(22) Filed: Aug. 9, 2007

(65) Prior Publication Data

US 2008/0025676 A1    Jan. 31, 2008

Related U.S. Application Data

(63) Continuation-in-part of application No. 10/965,984, filed on Oct. 15, 2004, and a continuation-in-part of application No. 11/732,996, filed on Apr. 5, 2007.

(51) Int. Cl.
G02B 6/36 (2006.01)
H04B 10/00 (2006.01)

(52) U.S. Cl. ............................ 385/89; 385/88; 385/92; 398/162; 398/171

(58) Field of Classification Search ................ 398/162, 398/171; 385/88–92
See application file for complete search history.

(56) References Cited

U.S. PATENT DOCUMENTS

| 4,994,675 | A | * | 2/1991 | Levin et al. | 250/551 |
| 5,801,860 | A | * | 9/1998 | Yoneyama | 398/94 |
| 6,359,708 | B1 | * | 3/2002 | Goel et al. | 398/15 |
| 6,504,630 | B1 | * | 1/2003 | Czarnocha et al. | 398/15 |
| 6,738,584 | B1 | * | 5/2004 | Tsuda et al. | 398/147 |
| 6,819,830 | B2 | * | 11/2004 | Chin | 385/24 |
| 7,062,177 | B1 | * | 6/2006 | Grivna et al. | 398/162 |

* cited by examiner

Primary Examiner—Uyen Chau N Le
Assistant Examiner—Rhonda S Peace (57) ABSTRACT

An integrated optoelectronic module and optical fiber for coupling a pair of information system devices having an electrical input/output interface using optical signal communication including an optical fiber; a housing on at least one end of the optical fiber including an electrical connector for coupling with one of said information system devices; an electro-optic subassembly disposed in the housing for coupling to the information system device integrally coupled and attached to the optical fiber for transmitting an optical signal over the fiber; a circuit disposed in the housing for detecting the power of the received optical signal; and a communications interface for communicating the received power level to allow setting of the remove optics transmitter.

18 Claims, 4 Drawing Sheets

LASER ADJUSTMENT IN INTEGRATED OPTOELECTRONIC MODULES/FIBER OPTIC CABLES

REFERENCE TO RELATED APPLICATIONS

This application is a continuation in part of U.S. patent application Ser. No. 10/965,984 filed Oct. 15, 2004, and U.S. patent application Ser. No. 11/732,996 filed Apr. 5, 2007, both assigned to the common assignee. This application is also related to U.S. patent application Ser. No. 11/854,319, filed Sep. 12, 2007, now issued as U.S. Pat. No. 7,494,287.

BACKGROUND OF THE INVENTION

1. Field of the Invention

The invention relates to optical communications systems, and parallel optic transceivers used in high throughput fiber optic communications links in local and wide area networks and storage networks, and in particular to fiber optic cables with integral transceivers mounted at each end for coupling to an electrical connector on an information system unit.

2. Description of the Related Art

Communications networks have experienced dramatic growth in data transmission traffic in recent years due to worldwide Internet access, e-mail, and e-commerce. As Internet usage grows to include transmission of larger data files, including content such as full motion video on-demand (including HDTV), multi-channel high quality audio, online video conferencing, image transfer, and other broadband applications, the delivery of such data will place a greater demand on available bandwidth. The bulk of this traffic is already routed through the optical networking infrastructure used by local and long distance carriers, as well as Internet service providers. Since optical fiber offers substantially greater bandwidth capacity, is less error prone, and is easier to administer than conventional copper wire technologies, it is not surprising to see increased deployment of optical fiber in data centers, storage area networks, and enterprise computer networks for short range network unit to network unit interconnection.

Such increased deployment has created a demand for electrical and optical transceiver modules that enable data system units such as computers, storage units, routers, and similar devices to be optionally coupled by either an electrical cable or an optical fiber to provide a high speed, short reach (less than 100 meters) data link within the data center.

A variety of optical transceiver modules are known in the art to provide such interconnection that include an optical transmit portion that converts an electrical signal into a modulated light beam that is coupled to a first optical fiber, and a receive portion that receives a optical signal from a second optical fiber and converts it into an electrical signal, and similar implementations employ one fiber for both optical signals, traveling in opposite directions. The electrical signals are transferred in both directions over an electrical connectors that interface with the network unit using a standard electrical data link protocol, such as Infiniband.

The optical transmitter section of such transceiver modules includes one or more semiconductor lasers and an optical assembly to focus or direct the light from the lasers into an optical fiber or fibers, which in turn, is connected to a receptacle or connector on the transceiver to allow an external optical fiber to be connected thereto using a standard connector, such as SC, FC, LC, or ribbon fiber type MPO. The optical receive section includes an optical assembly to focus or direct the light from the optical fiber or fibers onto a photodetector or array, which in turn, is connected to an IC circuit on a circuit board.

Optical transceiver modules are therefore packaged in a number of standard form factors which are "hot pluggable" into a rack mounted line card network unit or the chassis of the data system unit. Standard form factors set forth in Multiple Source Agreements (MSAs) provide standardized dimensions and input/output interfaces that allow devices from different manufacturers to be used interchangeably. Some of the most popular MSAs include XENPAK (see www.xenpak.org), X2 (see www.X2 msa.org), SFF ("small form factor"), SFP ("small form factor pluggable"), XFP ("10 Gigabit Small Form Factor Pluggable", see www.XFPM-SA.org), and the QSFP ("Quad Small Form-factor Pluggable," see www.QSFPMSA.org).

In addition to such pluggable modules, customers and users of such systems are increasingly interested in fiber optic cables which incorporate integral transceivers fixedly mounted on the ends of such cables such as described in U.S. patent application Ser. No. 10/965,984. In order to increase the number of interconnections or port density associated with the network unit, such as, for example in rack mounted line cards, switch boxes, cabling patch panels, wiring closets, and computer I/O interfaces, such transceivers should be able to couple to multiple parallel optical fibers, or ribbons, and utilize parallel electro-optical converters in the transceivers.

A typical parallel optical transceiver consists of a vertical cavity surface emitter laser (VCSEL) array, and a PIN diode array. A parallel optical ribbon can be inserted into the optical transceiver, coupling to the VCSEL array or the PIN diode array, and individual lane transmitter and receiver properties can be measured. In these measurements the light source, a VCSEL array is adjusted or programmed over temperature to maintain good operating characteristics. The purpose of such receiver side measurements is that the driving conditions (e.g. bias voltage and current) of the VCSELs (or any other lasers) need to be adjusted and set at the factory since their threshold and efficiency varies from device to device and also changes as a function of temperature.

In an integrated module/optical cable, the parallel ribbon fiber may be permanently attached to electrical-optical converters at both ends. Since the optical interface is not accessible on either end, the VCSEL performance can not be measured or characterized directly. An alternative method must be found to properly characterize the performance of VCSEL over temperature to ensure the performance of the communications link.

SUMMARY OF THE INVENTION

Briefly, and in general terms, the present invention provides, an integrated optical fiber and optoelectronic module for optically coupling a pair of information system devices having an electrical input/output interface using optical signal communication including an optical fiber; a first term housing including (i) an electrical connector for coupling with one of the information system devices and for transmitting or receiving information-containing electrical signals over the connector; (ii) an electro-optic subassembly disposed in the housing for coupling to the information system device for converting the electrical signal to a modulated optical signal corresponding to the electrical signals at a predetermined wavelength, the subassembly being integrally coupled and attached to the optical fiber for transmitting or receiving an optical signal; a power detector circuit disposed in the housing for detecting the power level of the optical signal received over the optical fiber; and a communications interface disposed in the housing for communicating the power level to allow setting of the operational parameters in the remote device.

In another aspect, the invention provides an electro-optical connector module integral with an optical fiber cable having a plurality of parallel optical transmit lanes and a plurality of parallel optical receiver lanes, the module comprising optical receiver lane signal detection circuitry to detect the signal power on one or more of the receive lanes, and optical transmit lane control circuitry to transmit a control mode optical signal indicating the received signal power on the corresponding receive lane.

In another aspect, the invention provides a communications cable for providing a short range, high speed optical data communications link between information system units including a group of 2N optical fibers, where N is a positive integer; a first terminal housing integral with and disposed at a first end of said 2N optical fibers, including (i) an multi-channel electro-optical converter including a VCSEL array abutting and coupled to a first set of N of said optical fibers, and a photodiode array abutting and coupled to a second set of N of said optical fibers; (ii) signal detection means coupled to said photodiode array for determining the power of a optical signal on at least one of said optical fibers; (iii) power adjustment means coupled to said VCSEL array for adjusting the power output of at least one of said VCSELs in response to the level of received power of said one VCSEL in said second terminal housing; and (iv) an electrical connector extending from the housing and adapted to mate with a corresponding electrical connector on a first external information system unit for transferring information signals between the unit and the communications link; and a second terminal housing integral with and disposed at a second end of said 2N optical fibers, including (i) an multi-channel electro-optical converter including a VCSEL array abutting and coupled to the second set of N of said optical fibers, and a photodiode array abutting and coupled to the first set of N of said optical fibers; (ii) signal detection means coupled to said photodiode array for determining the power of a optical signal on at least one of said optical fibers; (iii) power adjustment means coupled to said VCSEL array for adjusting the power output of at least one of said VCSELs in response to the level of received power of said one VCSEL in said first terminal housing; and (iv) an electrical connector extending from the housing and adapted to mate with a corresponding electrical connector on a second external information system unit for transferring information signals between the unit and the communications link.

In another aspect, the invention provides a communications cable for providing a short range, high speed optical data communications link between information system units including: a group of 2N optical fibers, where N is a positive integer; a first terminal housing integral with and disposed at a first end of said 2N optical fibers, including (i) an multi-channel electro-optical converter including a VCSEL array abutting and coupled to a first set of N of said optical fibers, and a photodiode array abutting and coupled to a second set of N of said optical fibers; and (ii) an electrical connector extending from the housing and adapted to mate with a corresponding electrical connector on a first external information system unit for transferring information signals between the unit and the communications link; and a second terminal housing integral with and disposed at a second end of said 2N optical fibers, including (i) an multi-channel electro-optical converter including a VCSEL array abutting and coupled to the second set of N of said optical fibers, and a photodiode array abutting and coupled to the first set of N of said optical fibers; and (ii) an electrical connector extending from the housing and adapted to mate with a corresponding electrical connector on a second external information system unit for transferring information signals between the unit and the communications link.

In a preferred embodiment, the module also includes optical receiver lane signal detection circuitry for detecting the transmitted control mode optical signal, and to controlling the laser bias of the corresponding laser to the receive lane on which the optical signal was received.

Some implementations of the present invention may incorporate or implement fewer of the aspects and features noted in the foregoing summaries.

BRIEF DESCRIPTION OF THE DRAWINGS

These and other features and advantages of this invention will be better understood and more fully appreciated by reference to the following detailed description when considered in conjunction with the accompanying drawings, wherein.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

DESCRIPTION OF THE PREFERRED EMBODIMENT

Details of the present invention will now be described including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of the actual embodiment nor the relative dimensions of the depicted elements, and are not drawn to scale.

The present invention relates generally to the adjustment of laser transmitter parameters, such as electrical bias and operating temperature in optical communications transceiver modules used in fiber optic communications systems.

Figure 1:
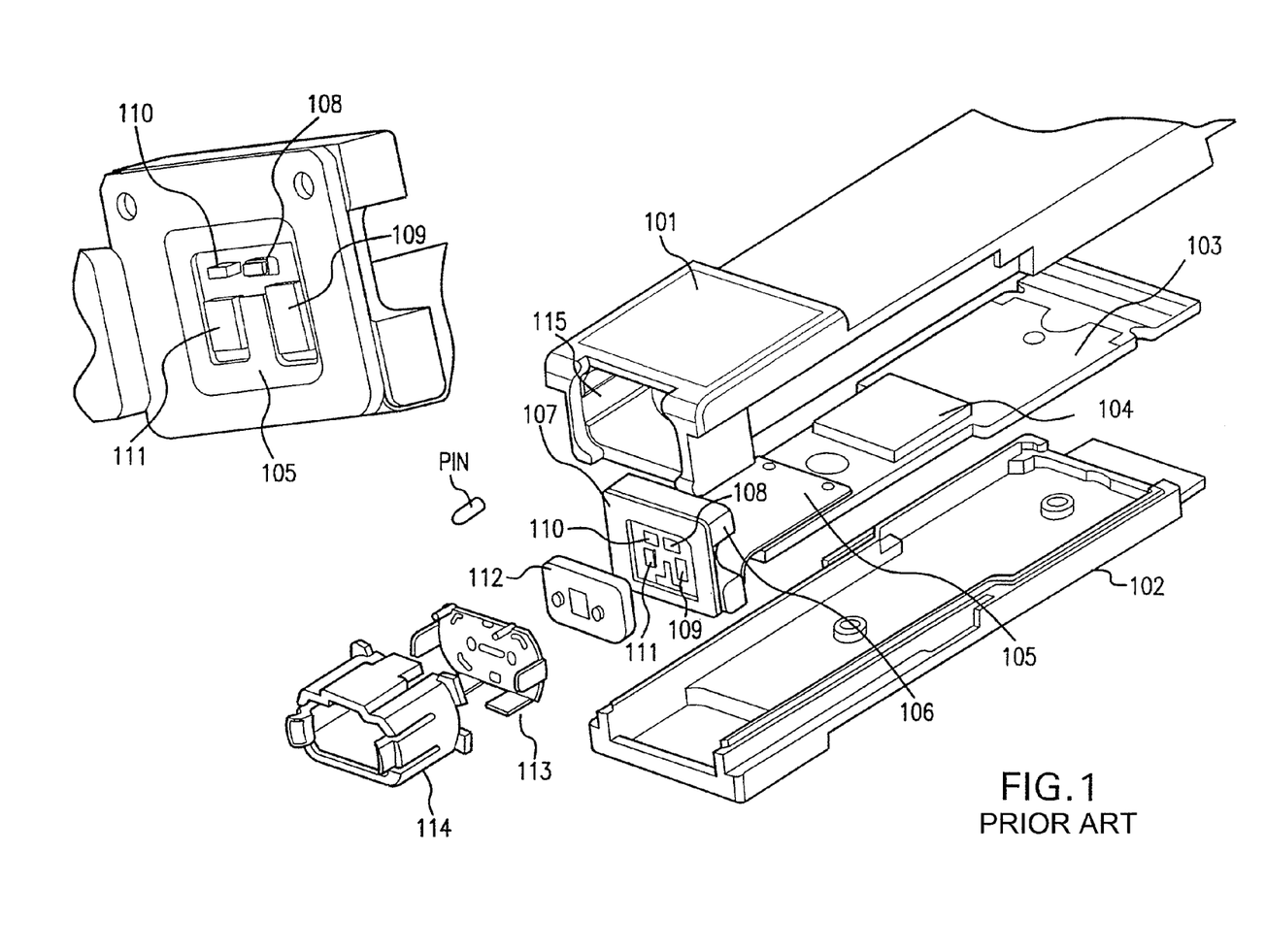
FIG. 1 is an exploded perspective view of a pluggable parallel optoelectronic module as known in the prior art coupled to a ribbon fibers.

Referring now to FIG. 1, there is shown an exploded view of an exemplary pluggable optical transceiver module 100 as known in the prior art. In this particular example, the module 100 is compliant with the QSFP MSA. In this particular case the optical transceiver has four transmit channels and four receiving channels. Each transmit channel can transmit optical signal at 850 nm or its vicinity, at up to 10 Gbps data rate.

Each receiving channel can receive the 850 nm signal and convert it into an electrical signal at the same data rate.

The transceiver module 100 includes a two-piece housing including a base 102 and a cover 101. The housing 101 and 102 are constructed of die-case or milled metal, preferably die-cast zinc, although other materials also may be used, such as specialty plastics and the like. Preferably, the particular material used in the housing construction assists in reducing EMI.

The front end of the housing 102 includes a port 115 for securing a MPO insert 114. The insert is configured to receive an MPO fiber optic connectors (not shown) which mate with optical lens 112 An EMI blocker 113 is inserted in between the lens and the MPO insert to block EMI from emitting into open space in the front.

In the illustrated example, the housing holds one subassembly or circuit boards, including a rigid circuit board 103, a flexible board 105, a microprocessor 104 which is used to control the laser driver IC 109 and receiver IC 111. Both ICs sit on a thermally conductive substrate 106, and are connected to the flexible circuit board 105 through wirebond. A VCSEL array 108 and photodiode array 110 are also located on the substrate 106, and are wirebonded to 109 and 111 respectively. The optical lens array 112 is aligned to both the VCSEL array 108 and photodiode array 110 to provide best coupling from the VCSEL array to the fiber ribbon, and from fiber ribbon to the photodiode array.

Figure 2:
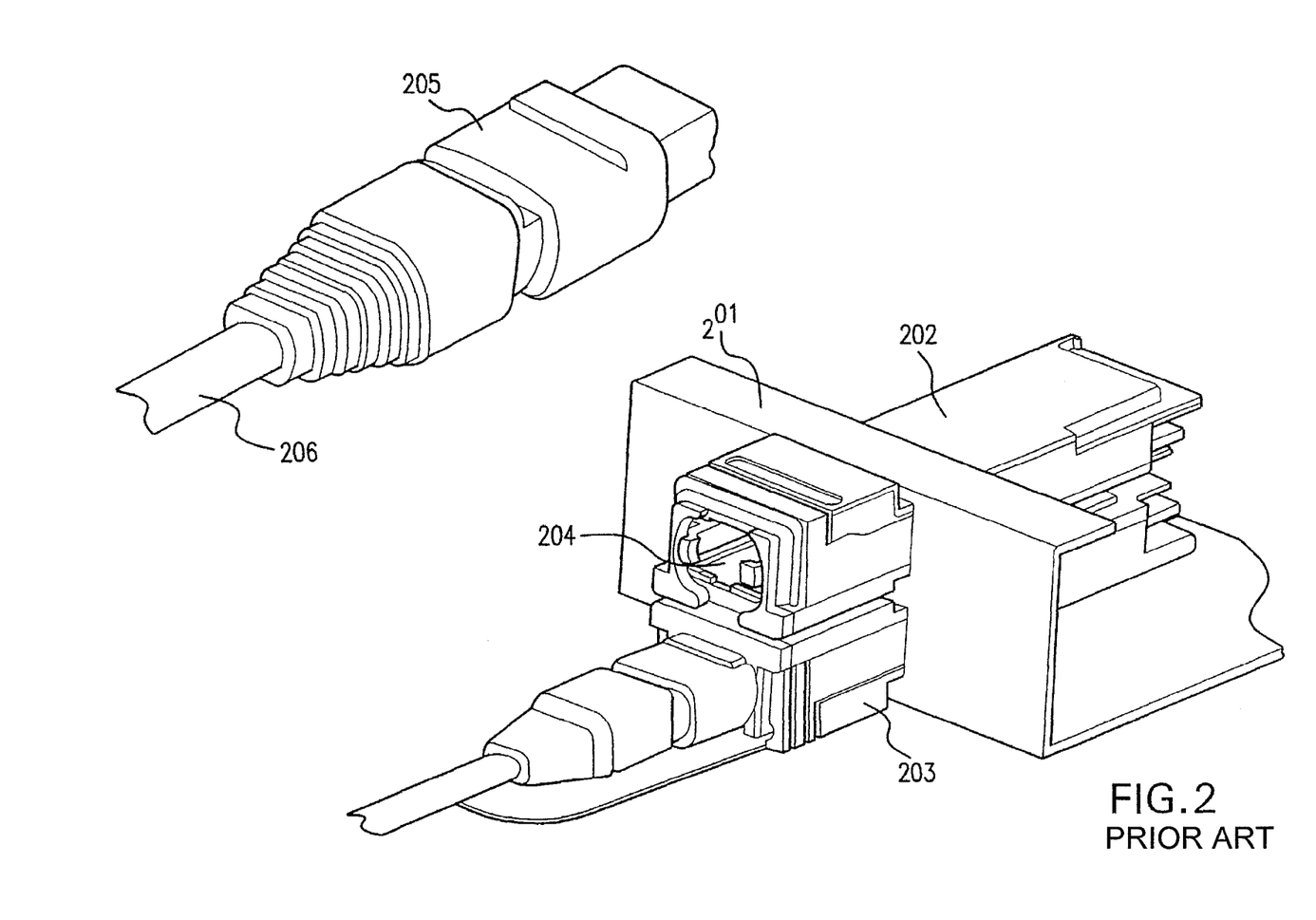
FIG. 2 is a perspective view of a pluggable module being inserted into a receptacle or cage in a host unit.

FIG. 2 is a perspective view of a prior art pluggable modules (202 and 203) inserted into a receptacle or cage in a host unit. An optical cable connector 205 is employed to connect module 202 to the host optical cable plant 206 by mating with the pluggable fiber port 204 within module 202.

Figure 3:
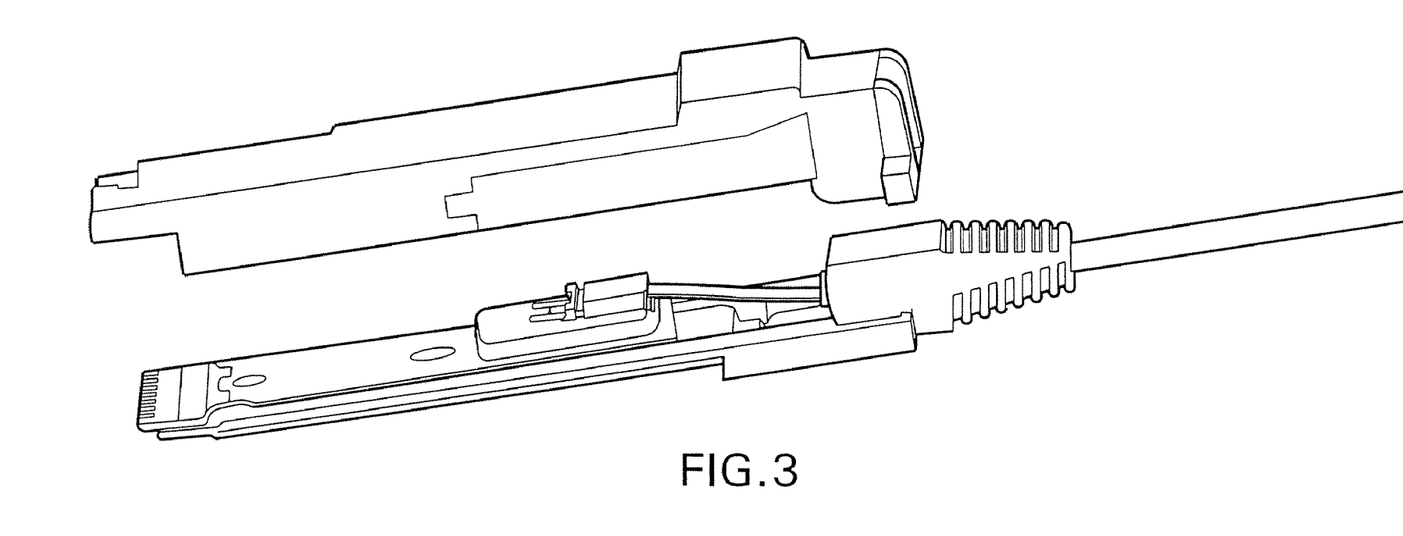
FIG. 3 is a highly simplified perspective view of an integral transceiver/optical fiber cable at one end of a fiber according to the present invention.

FIG. 3 is a perspective view of an integrated transceiver/optical fiber according to the present invention. The transceiver module 400 at one end of the cable includes a two-piece housing 300 including a base 301 and a cover 302. In addition, contact strips (not shown) may be provided to ground the module to an external chassis ground as well. The housing 300 is constructed of die-case or milled metal, preferably die-cast zinc, although other materials also may be used, such as specialty plastics and the like. Preferably, the particular material used in the housing construction assists in reducing EMI. A similar configuration is shown in U.S. Pat. No. 7,137,744 of the present assignee, which is hereby incorporated by reference.

Figure 4:
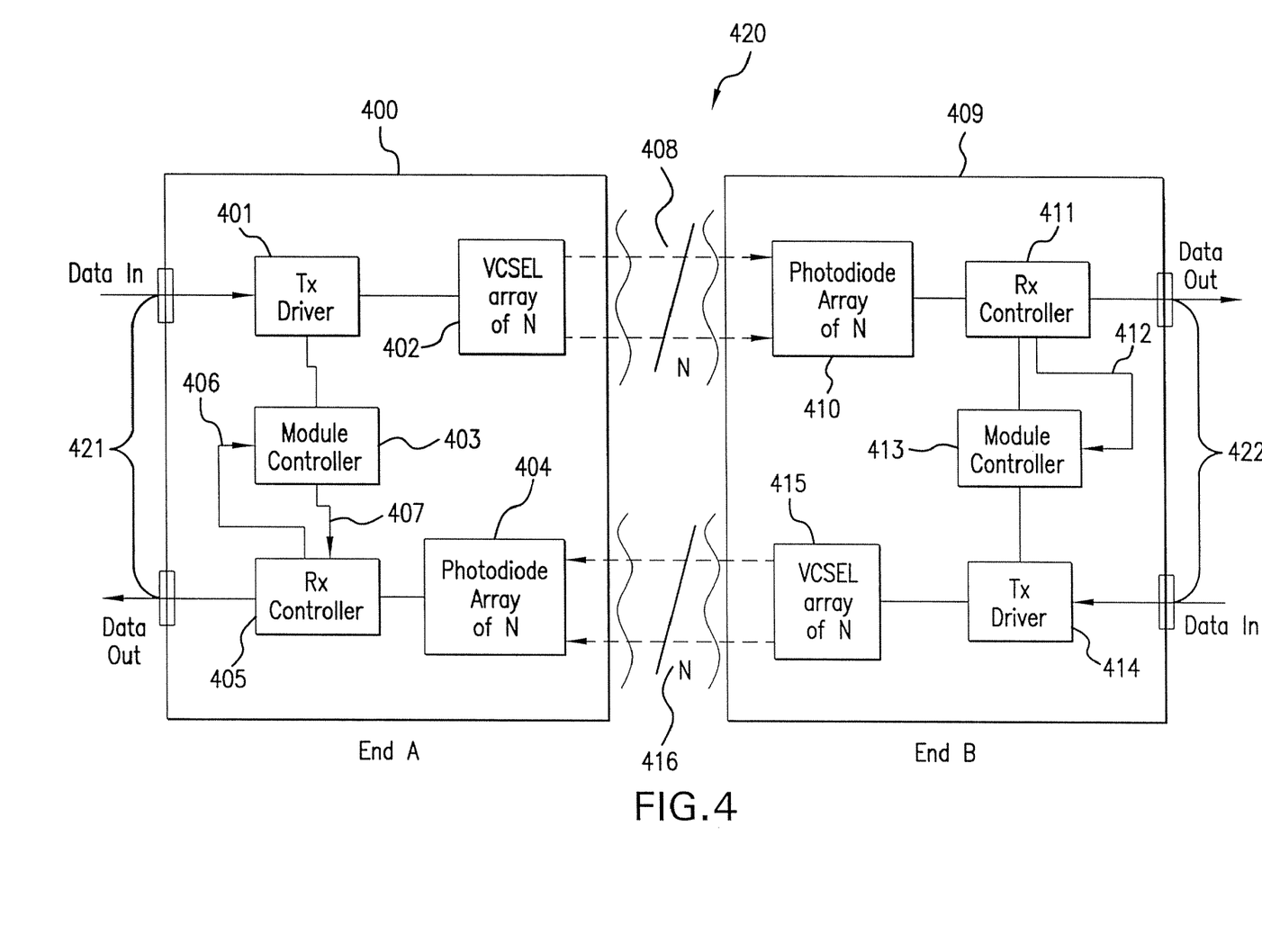
FIG. 4 is a highly simplified block diagram of a transceiver module according to the present invention.

The front end of the housing 303 includes a faceplate 304 that secures the optical fiber ribbon 420 (as shown in FIG. 4).

In the illustrated example, the housing 300 holds a simple printed circuit board 305 including a transmit driver IC 401, a receive controller 405, and a microprocessor or module controller. An electrical connector 421 is formed by electrical contacts on both sides of the module, to provide an electrical interface to the mating receptacle connector on the external computer or communications unit (not shown). The VCSEL transmit subassembly 402 includes a VCSEL array of N semiconductor lasers, which may be mounted in a single plastic enclosure 306, which interfaces to N fibers of a fiber ribbon ferrule 307.

Adjacent to the VCSEL array 402 is a photodiode array 404 which interfaces to the ribbon ferrule 307, and thereby to N fibers of the 2N fiber ribbon cable 420. The enclosure 306 is electrical coupled to the printed circuit board 305 by means of the flex cable 307 and mechanical supports 308, 309 which sandwich the printed circuit board (PCB) 305 there between, and allow the cable 307 to make electrical contact with appropriate traces on board 305.

Other electrical components 310, 311, 403 for driving the VCSEL transmitters 402, and amplifying and processing the signals from the photodiode array 404 are also shown mounted on the PCB 305, and will be described in greater detail in connection with FIG. 4.

On the right hand side of the Figure is depicted the ribbon ferrule 307 which secures the ribbon cable 420 to the housing 400. The ribbon ferrule 307 allows the individual fibers in the cable 420 to be aligned with the N VCSELs and N photodiodes as disposed on the enclosure 306. Suitable alignment pins and mating receptacles are provided on the enclosure 306 and the ferrule 307 so that the optical coupling between the VCSEL/photodiode array and the fiber ribbon may be achieved in the most expeditious manner from a manufacturing perspective, the details of which go beyond the scope of the present invention. Suffice it to say that once aligned, the ferrule is glued or otherwise fixedly secured to the enclosure 306 so that the ribbon cable 420 is fixedly secured to the transceiver module 400.

FIG. 4 is a block diagram illustrating an integrated optoelectronic module/fiber optic cable with an electro-optical module at each end according to an embodiment of the invention. Here, a first electro-optical module 400 at end A of the cable is provided, which is connected, via a parallel optical ribbon 420 comprising 2N fibers, where N is an integer, to a second electro-optical module 409, provided at end B of the cable. The first electro-optical module 400 comprises a VCSEL array 402, comprising N VCSELs arranged in parallel. Also provided is a photodiode array 404, comprising N photodiodes arranged in parallel. A module controller 403 is further provided, as well as a receiver controller 405, arranged to receive signals from the photodiode array. A transmitter driver 401, which controls the VCSEL array, is also included.

The transmitter driver 401 is arranged to receive data from a coupled information system device, in the form of an electrical signal over electrical connector 421, and to control the VCSEL, which converts the electrical signal into an optical signal, which is transmitted via the parallel optical fiber 420. Similarly, the parallel optical signal received at the photodiode array 404 is converted into an electrical signal and passed to the receiver controller 405, and then output as an electrical data output signal over connector 421. The overall operation of the electro-optical module 400 to convert between the optical and electrical domains is controlled by the module controller 403, in a conventional manner.

The electro-optical module 409 has a corresponding structure to the first electro-optical module 400. In this respect, the second electro-optical module 409 comprises a photodiode array 410, having N photodiodes arranged in parallel. The photodiode array 410 feeds a signal to the receiver controller at 411, which then outputs an electrical data out signal. Also provided is a VCSEL array 415, comprising N VCSEL lasers arranged in parallel. A transmitter driver circuit 414 is arranged to receive an electrical data input signal, and to drive VCSEL array 415 so to produce a parallel optical signal, which is then output over the N fibers 416. The overall operation of the electro-optical module 409 to convert between the electrical and optical domains is controlled by the module controller 413, in a conventional manner. It should be noted that the photodiode array 410 of the second electro-optical module 409 is coupled by N fibers 408 to the VCSEL array 402 of the first electro-optical module 400, while the VCSEL array 415 of the second electro-optical module 409 is coupled to the photodiode array 404 of the first electro-optical module 400. The coupling is performed by a parallel optical ribbon, in this case having 2N optical fibers, with N fibers 408 carrying the signal from 402 to 410, and N fibers 416 carrying the signals from 415 to 404.

Thus, according to the embodiment, where an electro-optical module according to the embodiment detects the power level of a received signal on one of its receive lanes, it converts the data into an electrical control signal which is transmitted preferably in a predetermined format to the remote transmitting module.

The control signal 406 is applied to the module controller 403 to set power level of each VCSEL in the array 402 in response to the respective received power in the photodiode array 410 in module 409. A similar operation would be performed in module 400 to set the power level of VCSEL array 415. Such an adjustment in bias and operating current is done by conventional techniques known in the art, and allows both the modules 400 and 409 to be adjusted and tuned at the factory, so that the entire integral transceiver/fiber cable assembly 400, 420, 409 is ready for use when received by the customer or end user.

Within the above described first embodiment there is a corresponding number of transmit and receive lanes at both transceivers, providing a one to one correspondence. However, while this is preferred to give the greatest open fiber signaling resolution, in other embodiments there can be a different number of transmit and receive lanes, provided that each transmit lane is "paired" with a receive lane, even if more than one transmit lane/receive lane is paired with the same receive lane/transmit lane.

In summary, therefore, the embodiments of the invention allow the VCSELs driving parallel optical links to be adjusted and controlled substantially on a per lane basis, by pairing transmit and receive lanes.

Further modifications, substitutions, additions and/or rearrangements to the above described embodiments and falling within the spirit and/or scope of the underlying inventive concept will be apparent to the person skilled in the art to provide further embodiments of the invention, any and all of which are intended to be encompassed by the appended claims.

Various aspects of the techniques and apparatus of the present invention may be implemented in digital circuitry, or in computer hardware, firmware, software, or in combinations of them. Circuits of the invention may be implemented in computer products tangibly embodied in a machine-readable storage device for execution by a programmable processor, or on software located at a network node or web site which may be downloaded to the computer product automatically or on demand. The foregoing techniques may be performed by, for example, a single central processor, a multi-processor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be compiled or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

It will be understood that each of the elements described above, or two or more together, also may find a useful application in other types of constructions differing from the types described above.

While the invention has been illustrated and described as embodied in an optical transmission system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

The invention claimed is:

1. An integrated optical fiber and optoelectronic module for optically coupling a pair of information system devices having an electrical input/output interface comprising:

a plurality of optical fibers for communicating data between the pair of information system devices;

an integral terminal housing with a top housing shell and a bottom housing shell and located at one end of the optical fiber including:

an electrical connector for coupling with one of said information system devices and for transmitting information-containing electrical signals over said connector, said connector having a plurality of terminals with at least some terminals assigned to each of a plurality of communication channels, where the sets of terminals of the communication channels are non-coincident and where the electrical connector is adapted to detachably mate with a corresponding electrical receptacle on an external information system unit for transferring an information signal on each of the plurality of channels between the optical fibers and the external information system unit, an electro-optic subassembly disposed in said housing for converting the electrical signal to and from a modulated optical signal corresponding to the electrical signals at a predetermined wavelength, said subassembly being integrally coupled and attached to said optical fiber for transmitting or receiving an optical signal to or from a remote device, a power detection circuit disposed in said housing for detecting the power level of the optical signal received over the optical fiber from a remote transmitter, and a communications interface disposed in said housing for communicating the magnitude of said received power level through any one of said plurality of optical fibers to allow setting of operational parameters in the remote device;

a circuit board disposed between the top and bottom housing shells; and a multi-channel signal converter having a plurality of channels, each with a respective optical transmitter and optical receiver disposed on the circuit board and wherein each channel of the plurality of channels of the signal converter is connected to a respective channel of the electrical connector for converting the information signal on each of the plurality of channels between an electrical signal and a corresponding optical signal, wherein the plurality of optical fibers include a first end integrated into said signal converter and extending from the terminal housing for transmitting the information signals.

2. The integrated module of claim 1, wherein said power detection circuit includes a photodiode and a signal processing circuit for producing a power adjustment signal.

3. The integrated module of claim 2, wherein the output of said signal processing circuit is coupled to said electro-optical assembly for optically transmitting the power adjustment signal to the remote device.

4. The integrated module of claim 3, wherein said electro-optical subassembly includes a power adjustment circuit responsive to a power adjustment signal for adjusting the power of the output optical signal.

5. The integrated module of claim 4, wherein the electro-optical assembly includes a VCSEL, and said power adjustment circuit sets the output power of the VCSEL.

6. The integrated module of claim 5, wherein the power adjustment signal sets the operating temperature of the VCSEL.

7. The integrated module of claim 2, wherein the power adjustment signal is transmitting during a control mode of operation of the module.

8. The integrated module of claim 1, wherein said electrical connector is an Infiniband connector.

9. The integrated module of claim 1, wherein the other end of the fiber is coupled to a second terminal housing located at the other end of the optical fiber including (i) an electrical connector for coupling with one of said information system devices and for transmitting information containing electrical signals over said connector; (ii) an electro-optic subassembly disposed in said second housing for converting the electrical signal to and from a modulated optical signal corresponding to the electrical signals at a predetermined wavelength, said subassembly being integrally coupled and attached to said optical fiber for transmitting or receiving an optical signal; (iii) a power detection circuit disposed in said second housing for detecting the power level of the optical signal received over the fiber from the first terminal; and (iv) a communications interface disposed in said second housing for communicating the magnitude of said received power level to allow setting of operational parameters in the electro-optical subassembly in the first terminal housing.

10. The integrated module of claim 1, wherein said optical fiber is approximately 10 meters in length.

11. A communications cable for providing a short range, high speed optical data communications link between information system units comprising:
a group of 2N optical fibers, where N is a positive integer;
a first terminal housing integral with and disposed at a first end of said 2N optical fibers, including (i) a first multi-channel electro-optical converter including a VCSEL array abutting and coupled to a first set of N of said optical fibers, and a photodiode array abutting and coupled to a second set of N of said optical fibers; (ii) a first signal detector coupled to said photodiode array for determining the power of an optical signal on at least one of said optical fibers and for generating a first power control signal; (iii) a first power adjustment circuit coupled to said VCSEL array for adjusting the power output of at least one of said VCSELs in response to the level of received power of said one VCSEL; and (iv) a first electrical connector extending from the first terminal housing and adapted to mate with a corresponding electrical connector on a first external information system unit for transferring information signals between the first external information system unit and the communications cable; and
a second terminal housing integral with and disposed at a second end of said 2N optical fibers, including (i) a second multi-channel electro-optical converter including a VCSEL array abutting and coupled to the second set of N of said optical fibers, and a photodiode array abutting and coupled to the first set of N of said optical fibers; (ii) a second signal detector coupled to said photodiode array for determining the power of an optical signal on at least one of said optical fibers and for generating a second power control signal; (iii) a second power adjustment circuit coupled to said VCSEL array for adjusting the power output of at least one of said VCSFLs in response to the level of received power of said one VCSEL in said first terminal housing; and (iv) a second electrical connector extending from the second terminal housing and adapted to mate with a corresponding electrical connector on a second external information system unit for transferring information signals between the second external information system unit and the communications cable;
wherein every channel in the first set of N channels of the first multi-channel electro-optic converter is capable of transmitting said first power control signal to the second power adjustment circuit, and
wherein every channel in the second set of N channels of the second multi-channel electro-optic converter is capable of transmitting said second power control signal to the first power adjustment circuit.

12. The integrated module of claim 11, wherein said terminal housings include a module controller.

13. The integrated module of claim 12, wherein one of the first or second power adjustment circuits transmits a power adjustment signal during a control mode of operation of the module controller.

14. The integrated module of claim 11 wherein one of said first or second power adjustment circuits sets an output power of one of the VCSELs in a remote transmitter.

15. The integrated module of claim 11, wherein one of the first or second power adjustment circuits sets an operating temperature of one of the VCSELs in a remote transmitter.

16. The integrated module of claim 11, wherein said first power adjustment circuit adjusts the power output in response to the level of received power of said one VCSEL in said second terminal housing.

17. A communications cable for providing a short range, high speed optical data communications link between information system units comprising:
a group of 2N optical fibers, where N is a positive integer;
a first terminal housing integral with and disposed at a first end of said 2N optical fibers, including (i) a first multi-channel electro-optical converter including a VCSEL array abutting and coupled to a first set of N of said optical fibers, and a photodiode array abutting and coupled to a second set of N of said optical fibers; and (ii) a first electrical connector extending from the housing and adapted to mate with a corresponding electrical connector on a first external information system unit for transferring information signals between the unit and the communications cable; (iii) a first signal detector coupled to said photodiode array for determining the power of an optical signal on at least one of said optical fibers; (vi) a first optical transmit lane control circuitry to transmit a first control mode signal to a second terminal indicating the determined power on the at least one optical fiber; and (v) a first power adjustment circuit coupled to said VCSEL array for adjusting the power output of at least one of said VCSELs in response to the control mode signal indicating the level of received power of said one VCSEL; and the second terminal housing integral with and disposed at a second end of said 2N optical fibers, including (i) a second multi-channel electro-optical converter including a VCSEL array abutting and coupled to the second set of N of said optical fibers, and a photodiode array abutting and coupled to the first set of N of said optical fibers; and (ii) a second electrical connector extending from the housing and adapted to mate with a corresponding electrical connector on a second external information system unit for transferring information signals between the unit and the communications cable (iii) a second signal detector coupled to said photodiode array for determining the power of an optical signal on at least one of said optical fibers; (vi) a second optical transmit lane control circuitry to transmit a second control mode optical signal indicating to the first terminal the determined power on the at least one optical fiber; and (v) a second power adjustment circuit coupled to said VCSEL array for adjusting the power output of at least one of said VCSELs in response to the control mode signal indicating the level of received power of said one VCSEL in the first terminal; and wherein a first plurality of non-dedicated channels in the first set of N channels of the first multi-channel electro-optic converter capable of transmitting the first control mode optical signal to the second power adjustment circuit in addition to being capable of transmitting said information signals, and wherein a second plurality of non-dedicated channels channel in the second set of N channels of the second multi-channel electro-optic converter are capable of transmitting the second control mode optical signal to the first power adjustment circuit in addition to being capable of transmitting said information signals.

18. The communications cable of claim 16, wherein said first power adjustment circuit adjusts the power in response to the control mode signal indicating the level of received power of said one VCSEL in the second terminal.

* * * * *